(12) United States Patent
Ward

(10) Patent No.: US 7,168,208 B2
(45) Date of Patent: Jan. 30, 2007

(54) VEHICLE DOOR GUARDS

(75) Inventor: Peter Francis Ward, 89 Marion St., Unit 29, Brookline, MA (US) 02446

(73) Assignee: Peter Francis Ward, Allston, MA (US)

( * ) Notice: Subject to any disclaimer, the term of this patent is extended or adjusted under 35 U.S.C. 154(b) by 29 days.

(21) Appl. No.: 10/121,178

(22) Filed: Apr. 12, 2002

(65) Prior Publication Data

US 2004/0098921 A1    May 27, 2004

(51) Int. Cl.
*B60R 27/00* (2006.01)
(52) U.S. Cl. .................. 49/462; 296/207; 206/453
(58) Field of Classification Search .......... 296/152,
296/207; 49/462; 206/453, 586; 410/41,
410/99; 293/142; 248/345.1; 52/717.05,
52/716.5
See application file for complete search history.

(56) References Cited

U.S. PATENT DOCUMENTS

| | | | | | |
|---|---|---|---|---|---|
| 1,168,986 | A | * | 1/1916 | Whittemore | 206/451 |
| 2,139,312 | A | * | 12/1938 | Mullens | 49/462 |
| 2,831,244 | A | * | 4/1958 | Adell | 228/142 |
| 3,047,142 | A | * | 7/1962 | Heffley | 206/453 |
| 3,144,236 | A | * | 8/1964 | Clanin | 150/154 |
| 3,150,854 | A | * | 9/1964 | Jamieson | 248/345.1 |
| 3,260,491 | A | * | 7/1966 | Goode | 248/345.1 |
| 3,550,951 | A | * | 12/1970 | Cobbs | 296/152 |
| 3,725,188 | A | * | 4/1973 | Kalt | 428/172 |
| 4,063,702 | A | * | 12/1977 | Wilde et al. | 248/345.1 |
| 4,240,225 | A | * | 12/1980 | Sartain | 49/462 |
| 4,377,056 | A | * | 3/1983 | Adell | 49/462 |
| 4,801,018 | A | * | 1/1989 | Wilde | 206/586 |
| 4,804,223 | A | * | 2/1989 | Iati | 296/152 |
| 4,852,744 | A | * | 8/1989 | Van Breemen | 206/586 |
| 4,998,380 | A | * | 3/1991 | Adell | 49/462 |
| 4,999,233 | A | * | 3/1991 | Probst et al. | 428/122 |
| 5,488,804 | A | * | 2/1996 | Batscher | 49/462 |
| 6,012,579 | A | * | 1/2000 | Tindoll et al. | 206/453 |
| 6,470,637 | B2 | * | 10/2002 | Gratz | 52/287.1 |

* cited by examiner

*Primary Examiner*—Stephen Gordon
(74) *Attorney, Agent, or Firm*—Chadbourne & Parke

(57) ABSTRACT

This invention relates to a safety guard designed and adapted for use on the corners of vehicle doors to protect passengers from accidental contact with the sharp corner of a vehicle door. The door guard is particularly well suited to cars with a "bubble-wrap" design, which results in the tops of the vehicle doors having sharp corners that may be less than ninety degrees. At least two plates, preferably triangular in shape and made of plastic or some other suitable material, are joined together on at least one side thereof and installed on a vehicle door to cover potentially hazardous sharp metallic corners of the vehicle door. The door guard may be affixed to the door using glue, or the plates of the door guard may have pre-drilled openings for screws to attach the door guard to the door. Variations in the thickness and shape of the plates may be necessary to conform to different vehicle types without interfering with the operation of the door. The door guard of the present invention may also be adapted for use on the trunk cover or hood cover of a vehicle.

15 Claims, 2 Drawing Sheets

VEHICLE DOOR GUARDS

FIELD OF THE INVENTION

The present invention relates to door guards and more particularly a door guard made of plastic or some other suitable material that is affixed to the corner of a vehicle door to protect a vehicle passenger from injury from contact therewith.

BACKGROUND OF THE INVENTION

Vehicle door guards have in the past been designed to protect doors from damage due to collision with other objects. As such they have been designed in the form of moldings or protectors on the exterior or open edge of a vehicle door, where the door is most likely to come into contact with other vehicles or barriers such as guard rails. Examples are disclosed in U.S. Pat, Nos. 4,429,013, 4,674,233, 4,741,126 and 4,998,380 to Adell.

In addition to being susceptible to damage from other objects, vehicle doors can pose a hazard to passengers and cause injury to those entering and exiting who may come into accidental contact with protruding corners of the door. That is particularly true in the case of vehicle doors on some newer model cars, which tend to have exposed sharp corners, in some cases forming an angle of less than ninety degrees, that curve inward to make the door conform as closely as possible to the curved aerodynamic shape of the vehicle. That results in the exposed corner being tilted towards the passenger's head when he enters or exits the vehicle. While this "bubble wrap" design is perhaps advantageous from an aesthetic and aerodynamic perspective, those corners can pose a hazard to passengers entering and leaving vehicles. For vehicles such as taxicabs that regularly pick up and discharge passengers who open and close the vehicle doors in the process, the chance of injury due to accidental contact with such corners is magnified. The sharp corner of a vehicle door presents a definite hazard to individuals entering or exiting a vehicle, especially older individuals or anyone whose height or posture may result in their eye or temple aligning with the sharp corner of a vehicle door.

It is therefore an object of this invention to provide a simple "door guard" that is attachable to the corner of a door frame to protect vehicle passengers from injury from potential contact with the door corner.

It is a further object of the invention that the door guard be easily installed and that it not interfere with the vehicle or the sealing of the doors It is a further object of the invention that the door guard be adaptable to different vehicle models.

SUMMARY OF THE INVENTION

In accordance with these and other objects, a vehicle door guard or trunk guard made of plastic or other suitable material is provided. A protective covering of plastic or rubber or other suitable material is interposed in such a fashion so as not to interfere with the operation of the door or the seal between the door and the body of the vehicle. Several means of attachment and design are contemplated. The bolt-on attachment is more permanent, especially in commercial vehicles. Alternatively, a one piece "glove" could be used, where the bolt holes are partially pre cut and can be readily punched out, or whereby the guard is attached with an adhesive glue.

The door guard is preferably molded to the shape of the door. The exterior shape, density and composition can be adjusted to provide maximum protection to the person while still avoiding interference with the door closure. Since the point of potential impact is the interior part of the door frame, the device must wrap around the corner to protect the inside. Additionally, the device is designed so that the rubber or plastic or other material corner of the protector is exaggerated, or formed with additional thickness in a circular fashion, so as to mitigate intrusion into the eye socket. The target market is service sedan type vehicles such as taxis, liveries, police cars and handicapped and special needs transportation, where there is a potential corporate liability issue. The most popular models for these vehicles are Ford Crown Victoria, Mercury Monarch, and Chevy Caprice, which are often originally used as police cars nationally, then sold to taxi companies. Additionally, national auto rental companies use these cars and resell them, often as taxis. The particular "bubble" shape of newer model vehicles, where the side of the car curves inward towards the top, makes this class of body design have particularly sharp corners.

The guard covers the sharp edges of the door without interfering with the functioning and sealing of the door. The guard may be fixedly attached using an adhesive or composite construction using bolts. In the event that bolts are used, the door is preferably drilled and rust proofed prior to installation. In the event that adhesive is used, the guard is preferably molded from one piece, either like a glove or folding over to conform to the model door to be protected. A generic version may be supplied and custom-cut to conform to different vehicle types, obviating the need to stock excess inventory of different sizes. The surface of the vehicle door to be covered is prepared by stripping the paint down to the bare metal and scoring the surface before application of an adhesive. In order to cover the corner of the door that may come into accidental contact with persons without interfering with the operation of the door, the actual membrane plate covering the potential contact point cannot be too thick. Therefore, variations in thickness, density, materials, and the amount of overlap, internally and externally to the shell of the vehicle door may be necessary depending on the particular car door. Alternatively, tabs are molded onto a generic triangle, and can be folded over and glued to form the interior protection. That design could be molded in several sizes and custom cut to fit different model vehicles.

DETAILED DESCRIPTION OF THE DRAWINGS

Figure 1:
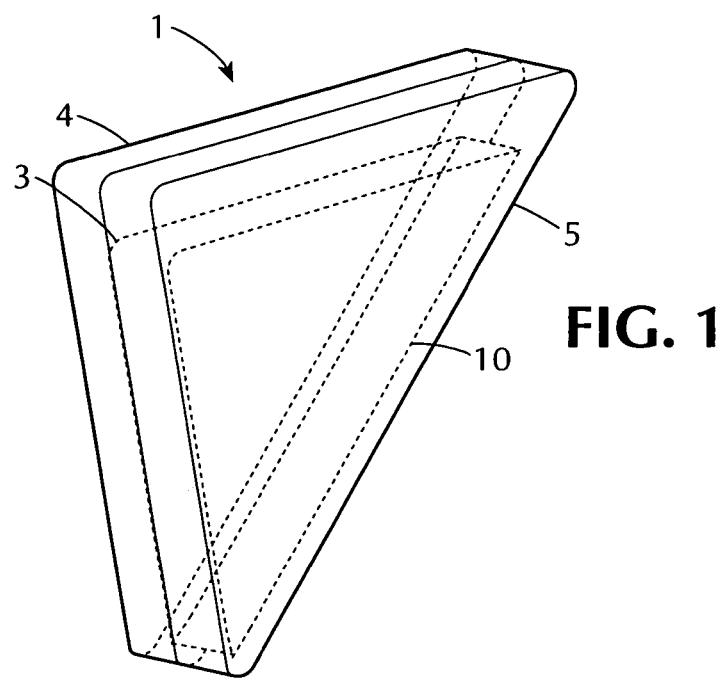
FIG. 1 shows an embodiment of the door guard comprising two joined pieces.
Figure 2:
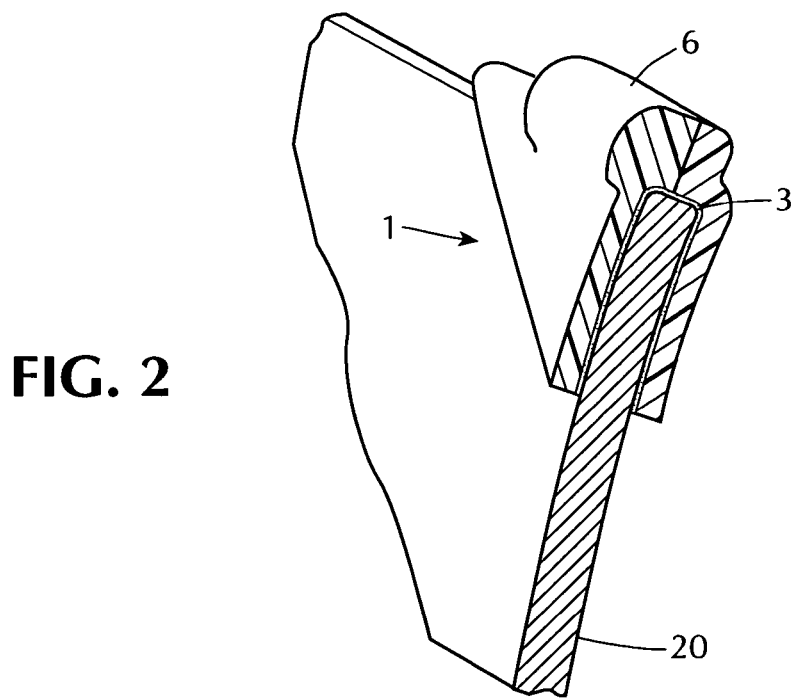
FIG. 2 is a side view of an embodiment of the door guard affixed by adhesive to a curved vehicle door.

As shown in FIG. 1, the door guard 1 preferably comprises two joined and opposing plates 4 and 5 of a generally triangular shape with an opening 10 on one of the sides thereof to fit over the corner 3 of a vehicle door. The door guard 1 may be made of rubber or plastic or some other suitable material to protect a person against injury from accidental yet potentially forcible contact therewith. In one embodiment shown in FIG. 2, the door guard 1 is attached to the corner 3 of the door 20 using glue, and in another embodiment shown in FIG. 3 the guard has openings 2 so that it may be attached to the door frame using bolts. FIG. 2 also shows the door guard 1 having a bulbous protrusion 6 at the tip thereof in order to prevent the corner from entering the eye socket.

Figure 4:
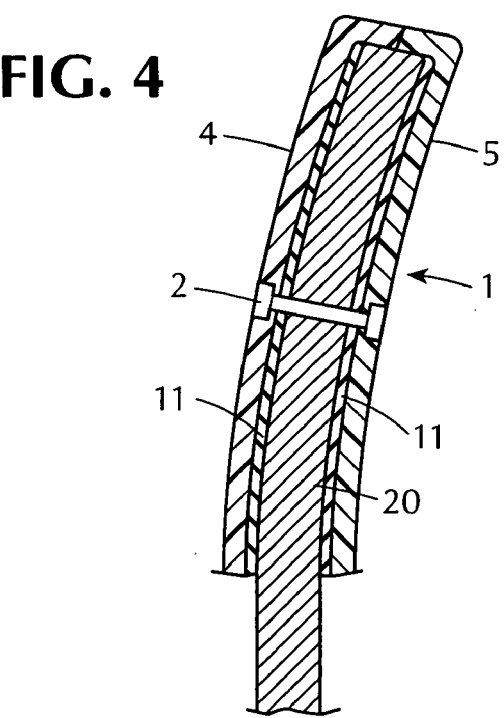
FIG. 4 is a cross-sectional view of an embodiment of the door guard affixed by screws to a curved vehicle door.

FIG. 4 shows a cross-sectional view of an embodiment of the door guard 1 over the frame using screws to bolt the door guard 1 to the door frame 20 through openings 2, with suitable spacing to accommodate different door frames from different model vehicles. While different size door guards can be supplied depending on the vehicle type, the door guard 1 preferably has a built-in tolerance to accommodate different door types. The interior 11 of the door guard 1 may be filled with rubber or some other malleable substance to secure it to the door frame. When bolts are used, the holes in the vehicle door itself are preferably treated with rust-proofing material prior to installation, to prevent rusting from metal of the screws contacting the metal of the vehicle door. Alternatively, rubber bolts can be used to prevent any potential for rusting.

Figure 3:
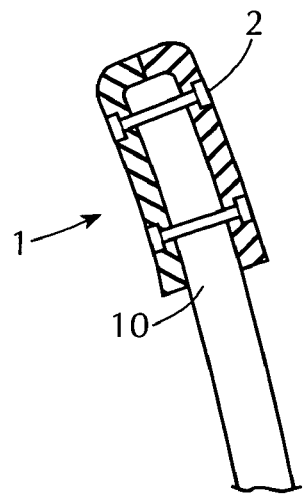
FIG. 3 is a cross-sectional view of an embodiment of the door guard affixed to a vehicle door using screws.
Figure 5:
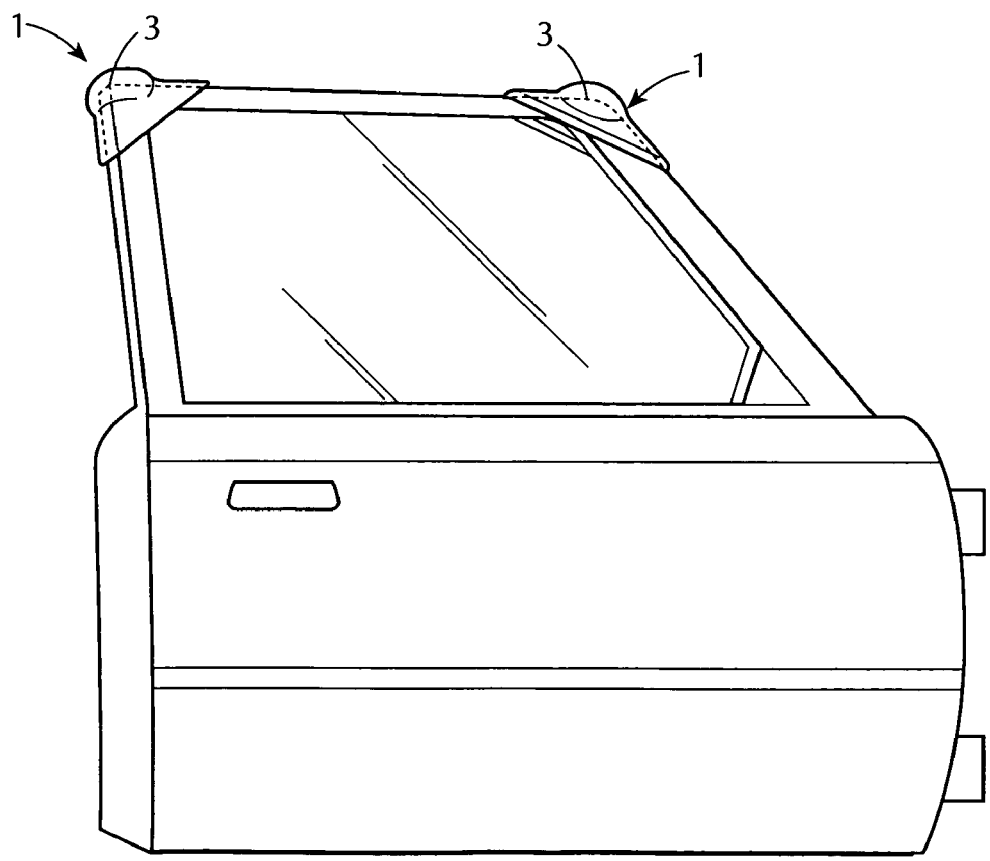
FIG. 5 is a view of an embodiment of the door guard affixed to the corner of a vehicle door.

The door guard 1 may also be cut by the installer to fit door frames 20 of various shapes and sizes for different vehicle types. FIG. 3 shows the door guard 1 installed on the corner of the door frame, also using bolts. A rounded or bulbous extrusion 6 of rubber or other material may be added to the corner of the door guard 1 as shown in FIG. 5 to prevent the protected corner 3 of the vehicle door from entering the eye socket.

The expression "guard" is used in a broad sense to comprehend the over-all attachment type accessory. For example, the guard of the present invention may be adapted for placement on the trunk cover or hood cover of a vehicle to protect against potentially hazardous contact therewith, in particular the trailing edge or latch protrusions thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A vehicle door guard for use in a motor vehicle, comprising:
   a first plate and a second plate made of resilient material; said first plate and said second plate superimposed and joined together on at least two sides thereof, forming an opening on a third side to receive a corner of a vehicle door, wherein an attachment surface of the guard extends substantially from a first corner of the guard to a second corner of the guard as an extension portion between the first and second corners of the guard wherein said vehicle door guard is of substantially triangular shape;
   said vehicle door guard covering said corner of said vehicle door to protect a vehicle passenger from impact therewith.

2. The vehicle door guard of claim 1, wherein said resilient material used for said first and second plates is plastic.

3. The vehicle door guard of claim 1, wherein said resilient material used for said first and second plates is rubber.

4. The vehicle door guard of claim 1, wherein said first and second plates have openings therein to accommodate screws to attach said vehicle door guard to vehicle doors.

5. The vehicle door guard of claim 1, having a bulbous protrusion at a junction corner point where said at least two joined sides of said first and second plates meet.

6. A vehicle door guard for use in a motor vehicle comprising:
   a first plate and a second plate made of resilient material, said first plate and said second plate of substantially the same size joined together on at least one side thereof, forming an opening on at least one other side thereof to receive a corner of a vehicle door, wherein an attachment surface of the guard extends substantially from a first corner of the guard to a second corner of the guard as an extension portion of the guard wherein the vehicle door guard is of a substantially triangular shape;
   said vehicle door guard covering said corner of said vehicle door to protect a vehicle passenger from impact therewith.

7. The vehicle door guard of claim 6, wherein said first plate and said second plate are oversized in relation to most vehicle doors so that they may be customized to accommodate each of said most vehicle doors prior to installation.

8. The vehicle door guard of claim 6, customized for use on a trunk cover of a vehicle to protect persons using said trunk cover from injury due to contact with said trunk cover while it is opening or closing.

9. The vehicle door guard of claim 8, wherein said vehicle door guard is customized for use on a trailing edge of said trunk cover.

10. The vehicle door guard of claim 8, wherein said vehicle door guard is customized for use on a latch mechanism of said trunk cover.

11. The vehicle door guard of claim 6, customized for use on a hood of a vehicle to protect persons using said hood from injury due to contact with said hood while it is opening or closing.

12. The vehicle door guard of claim 6, wherein said resilient material used for said first and second plates is plastic.

13. The vehicle door guard of claim 6, wherein said resilient material used for said first and second plates is rubber.

14. The vehicle door guard of claim 6, wherein said first and second plates have openings therein to accommodate screws to attach said vehicle door guard to vehicle doors.

15. The vehicle door guard of claim 6, wherein said first plate and said second plate are oversized in relation to most vehicle doors so that they may be customized to accommodate each of said most vehicle doors prior to installation.

* * * * *